United States Patent
Tobias

(10) Patent No.: US 9,767,315 B1
(45) Date of Patent: Sep. 19, 2017

(54) SYSTEMS AND METHODS FOR INITIATING IMMEDIATE DATA ERASURE ON A DEVICE

(71) Applicant: Marc W. Tobias, Sioux Falls, SD (US)

(72) Inventor: Marc W. Tobias, Sioux Falls, SD (US)

( * ) Notice: Subject to any disclaimer, the term of this patent is extended or adjusted under 35 U.S.C. 154(b) by 0 days.

(21) Appl. No.: 14/520,428

(22) Filed: Oct. 22, 2014

Related U.S. Application Data

(60) Provisional application No. 61/896,718, filed on Oct. 29, 2013.

(51) Int. Cl.
- *G06F 21/62* (2013.01)
- *G06K 9/00* (2006.01)
- *G06F 21/32* (2013.01)

(52) U.S. Cl.
CPC .......... *G06F 21/6245* (2013.01); *G06F 21/32* (2013.01); *G06K 9/00013* (2013.01); *G06K 9/00087* (2013.01)

(58) Field of Classification Search
USPC .......................................................... 726/28
See application file for complete search history.

(56) References Cited

U.S. PATENT DOCUMENTS

| | | | |
|---|---|---|---|
| 4,420,794 A | 12/1983 | Anderson | |
| 5,003,801 A | 4/1991 | Stinar | |
| 5,749,253 A | 5/1998 | Glick | |
| 5,768,925 A | 6/1998 | Ozawa | |
| 5,775,148 A | 7/1998 | Layton | |
| 6,000,609 A | 12/1999 | Gokcebay | |
| 6,064,316 A | 5/2000 | Glick | |
| 6,442,986 B1 | 9/2002 | Russell | |
| 2003/0217276 A1* | 11/2003 | LaCous | G06F 21/32 713/186 |
| 2005/0149741 A1 | 7/2005 | Humbel | |
| 2007/0260888 A1* | 11/2007 | Giobbi | G07C 9/00087 713/186 |
| 2013/0036781 A1 | 2/2013 | Hartmann | |
| 2013/0307670 A1* | 11/2013 | Ramaci | G06F 21/6245 340/5.82 |

* cited by examiner

*Primary Examiner* — Anthony Brown
*Assistant Examiner* — Samuel Ambaye
(74) *Attorney, Agent, or Firm* — Jeffrey A. Proehl; Woods, Fuller, Shultz & Smith, P.C.

(57) ABSTRACT

A system and method of erasing data on a data handling device may include providing a device with a data storage element and a biometric characteristic scanning element, scanning a triggering biometric characteristic of a secured user by the scanning element, and storing protected data in a protected storage location on the data handling device. System and method may also include monitoring the scanning element for detection of a biometric characteristic, detecting a biometric characteristic by the scanning element, and determining if the detected biometric characteristic corresponds to the triggering biometric characteristic. If the detected biometric characteristic corresponds to the triggering biometric characteristic, then erasing data in the protected storage location.

18 Claims, 4 Drawing Sheets

US 9,767,315 B1

SYSTEMS AND METHODS FOR INITIATING IMMEDIATE DATA ERASURE ON A DEVICE

REFERENCE TO RELATED APPLICATIONS

This application claims the benefit of U.S. Provisional Patent Application No. 61/896,718 filed Oct. 29, 2013, which is hereby incorporated by reference in its entirety.

BACKGROUND

Field

The present disclosure relates to device and data security and more particularly pertains to a new systems and methods for initiating immediate data erasure on a device for providing security for information stored on the device.

SUMMARY

In one aspect, the present disclosure relates to a method of erasing data on a data handling device, and may comprise providing a data handling device including a data storage element configured to store data and a biometric characteristic scanning element configured to scan a biometric characteristic of a use, and scanning a triggering biometric characteristic of a secured user by the biometric characteristic scanning element and storing, on the data handling device, data characterizing the triggering biometric characteristic of the secured user. The method may also include storing protected data in a protected storage location on the data handling device, monitoring the biometric characteristic scanning device for detection by the scanning device of a biometric characteristic, detecting a biometric characteristic by the biometric characteristic scanning element, determining if the detected biometric characteristic corresponds to the triggering biometric characteristic, and if the detected biometric characteristic corresponds to the triggering biometric characteristic, then erasing data in the protected storage location.

In another aspect, the disclosure relates to a method of erasing data on a data handling device that may comprise providing a data handling device including a data storage element configured to store data and a fingerprint scanning element configured to scan a biometric characteristic of a user, scanning an authorizing fingerprint of an authorized user by the scanning element, and storing, on the data handling device, data characterizing the authorizing fingerprint of the authorized user. The method may also comprise scanning a triggering fingerprint of a secured user by the scanning element and storing, on the data handling device, data characterizing the triggering fingerprint of the secured user, the triggering fingerprint being different that the authorizing fingerprint, storing protected data in a protected storage location on the data handling device, and monitoring the fingerprint scanning device for detection by the scanning element of a fingerprint. The method may also comprise detecting a fingerprint by the scanning element, determining if the detected fingerprint corresponds to the triggering fingerprint, and if the detected fingerprint corresponds to the triggering biometric characteristic, then erasing all data in the protected storage location.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the particulars of the steps, or the details of construction and to the arrangements of the components, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
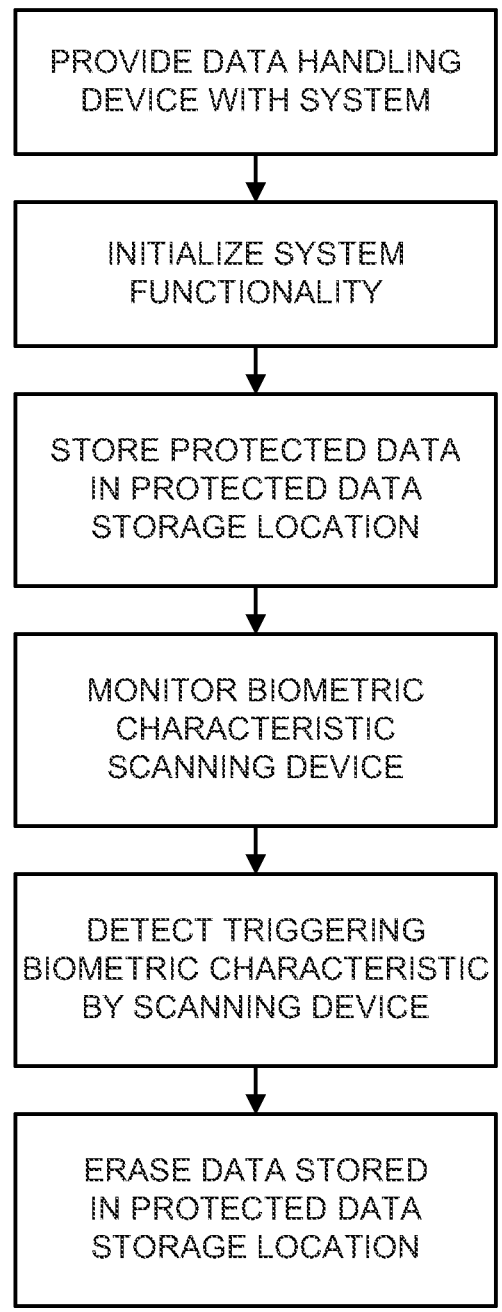
FIG. 1 is a schematic flow diagram of an illustrative implementation of a method of the disclosure.

With reference now to the drawings, and in particular to FIGS. 1 through 4B thereof, a new systems and methods for initiating immediate data erasure on a device embodying the principles and concepts of the disclosed subject matter will be described.

Applicant has recognized that there is a need to have the capability of rapidly and covertly erasing information that is stored on data storage elements, such as solid state memory devices or hard drives, which are a part of portable data handling devices. Instances where such a capability may be desirable include in the event of a potential theft, seizure, terrorist or criminal attack, or other circumstance requiring the immediate destruction of data stored on the data handling device. Such scenarios can arise specifically during routine police stops, cross-border digital searches, embassy incursions by hostile forces, kidnappings, armed robberies where the criminals seek codes, passwords, or other critical data that are contained on phones, thumb drives, external hard drives or other media. Such situations make it desirable for the user to erase the information on a virtually instantaneous basis, which often occurs without any prior warning to the user.

For example, border agents are allowed to search or seize such media carried by travelers, without probable cause or any warrants, and have abused their rights to seize devices carried by persons crossing border checkpoints. The problem is not limited to border agents. On numerous occasions throughout the United States and other countries, police officers on routine stops are able to seize or detain devices in order to access, copy, or obtain confidential or proprietary data from those in possession of devices with data storage capability.

Typically, data handling devices require the authentication of the user as an authorized user to enable access to the data in order to provide at least a minimal degree of data security for data stored on the device. Currently, the provision of even a minimal degree of data security for such devices requires that data on the devices cannot be erased without providing the proper authentication of an authorized user.

Applicant has recognized that in virtually all such devices, there is no immediate capability to erase data content and information stored within the data storage elements of the device. Applicant has also recognized that there is no known capability for the users of such devices to erase the information in a covert manner without alerting authorities, criminals, attackers or others that such erasure is occurring.

The systems and methods of the present disclosure provide an authorized individual with the ability to very rapidly erase information or data from a data storage element of the data handling device so that the data on the storage element cannot be improperly accessed by third parties, such as unauthorized individuals, and to initiate a process of one or more operations on the data handling device to perform functions that are not expected, anticipated, or known to those that may attempt to compromise the security of data or information stored on a data handling device.

Individuals that carry with them any form of data handling device that includes a data storage element containing data, and in particular data that contains sensitive, critical, confidential, or classified information, may find it desirable to be able to instantly erase such information from the storage element, and may be accomplished in a manner that is not anticipated or understood by unauthorized users. For example, if a device contains critical information and the owner or possessor determines that there is a need to erase some or all data on the device without the knowledge of any third party, he or she may simply trigger the functionality of the disclosure, such as, for example, by touching the fingerprint reader with the "erase" finger, and the data will be substantially instantly removed. This method of authentication and confirmation for the erasure functionality assures that data can only be erased by an individual authorized to initiate such functionality and that the erasure is unlikely to be triggered by mistake or erroneous command entry. For example, a supervisor who is the only person that has authorization to delete critical files may do so, while others not so authorized cannot, thus protecting audit trails and could protect the integrity of stored information that is required to be maintained and protected by federal or state statutes such as HIPPA or Sarbanes-Oxley from intentional deletion by unauthorized individuals.

The systems and methods of the disclosure may utilize biometric authentication for triggering of the functionality of the disclosure. Biometric authentication by the device may allow an authenticated individual to access and to erase information contained on the data storage element of the data handling device according to the disclosure, and may prevent any unauthorized user from accessing the same functionality improperly. Use of biometric authentication may also facilitate fail-safe operation for the deletion of information from the storage element and thus help avoid an erroneous or unintentional erasure of the storage element. In the most preferred implementations, the biometric characteristic utilized is the user's fingerprint, although other biometric characteristics including physiological and behavioral characteristics. For example, characteristics of the user's eyes may be utilized, such as iris and retina shape or configuration. It should also be recognized that a combination of biometric characteristics may also be employed.

Figure 4A:
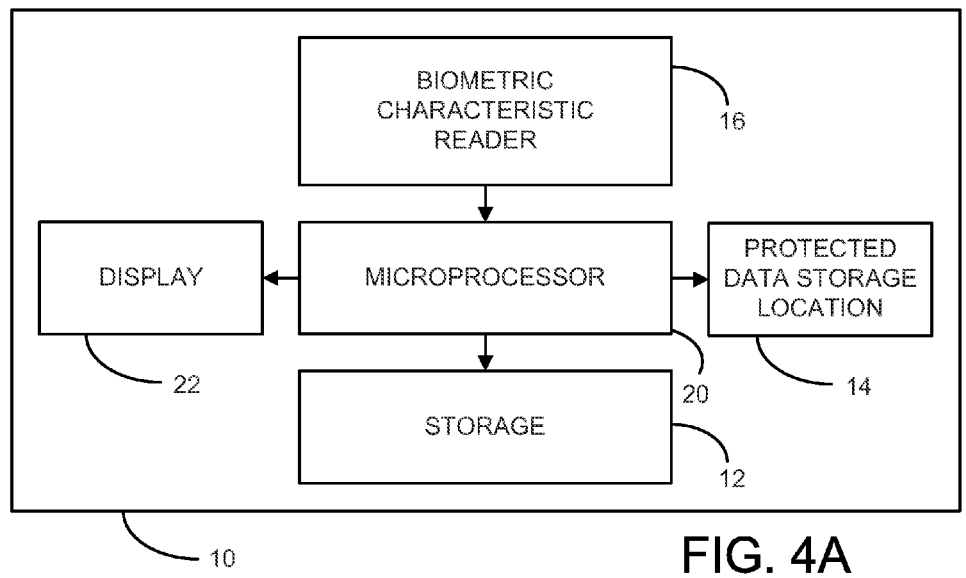
FIG. 4A is a schematic block diagram of one suitable embodiment of the system of the disclosure.
Figure 4B:
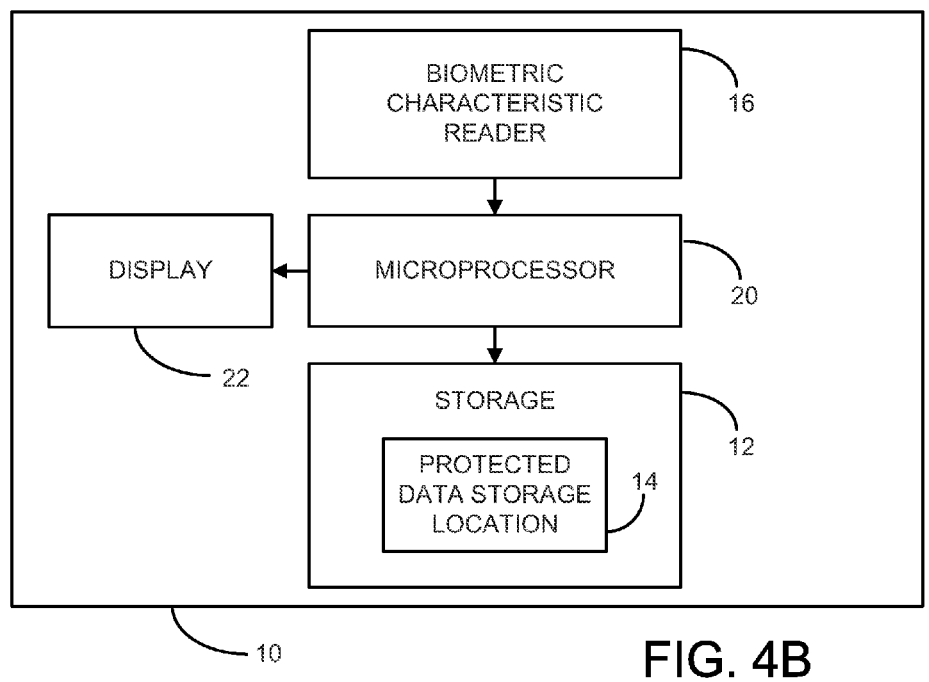
FIG. 4B is a schematic block diagram of one suitable embodiment of the system of the disclosure.

Some aspects of the disclosure relate to a system on which various aspects of methods of the disclosure may be implemented may include a data handling device 10, such as shown in FIGS. 4A and 4B. The data handling device 10 may comprise virtually any device with integral memory or storage that may hold data for any appreciable period of time, and which said data may be retrieved after being recorded in the memory or storage. The data handling device may comprise smartphones, personal digital assistants, (PDA), media players, tablet computers, laptop computers, portable storage devices (e.g., thumb drives, hard drives) and the like. Some of the most preferred implementations may utilize a separate and secure chipset to store biometric information in a manner that cannot be accessed, other than through an encrypted exchange of information between the device microprocessor, the secure chipset, and the biometric scanner. In some implementations, a separate secure element of the data handling device, such as specifically allocated memory (e.g., partition) or a separate memory element, may store the data utilized for the systems and methods of the disclosure, which may facilitate rapid electronic deletion when the biometric scanner receives the proper trigger.

The data handling device 10 may include a data storage capability or element configured to store data. In some embodiments, the device 10 may have a primary or main data storage element 12 for storing data that is not to be protected in the manner that is provided by this disclosure. The device may also include a protected data storage element 14 for which the erasure aspects of the present disclosure may apply. The protected storage element 14 may be a separate and discrete element from the primary data storage element 12 (see FIG. 4A), or may be a section or partition of the primary data storage element 12 (see FIG. 4B). The arrangement and relationship between the primary and protected data storage element, or locations on an element, should be suitable to permit the erasure of the data in the protected location without significant delay or interference.

The data handling device 10 may also have a biometric characteristic scanning element 16 configured to detect a biometric characteristic or characteristics of a person. One illustration of a highly suitable biometric characteristic is a fingerprint of a user of the data handling device, such as characteristics of the ridges on a finger pressed against the scanning element. The biometric scanning element may comprise an image scanning element, such as an embedded or integrated fingerprint reader or other suitable image reading or scanning device such as part of a display of the device. Illustratively, some form of fingerprint reader has been integrated into the hardware configuration of many devices for the purpose of controlling access to the device and thereby enhancing the security of the device. For example, some versions of the Apple iPhone include a fingerprint reader integrated into the home button. It should be recognized, however, that none of these devices, so far as is known, have utilized such technology for the purpose of erasing data in an immediate manner or step.

Additionally, the data handling device 10 may include a microprocessor 20 for handling various operations of the device as well as operations of the system disclosed herein. In some devices, the data handling device 10 may also include a display 22. Some implementations may utilize a separate and secure chipset to store biometric information in a manner that cannot be accessed, other than through an encrypted exchange of information between the device microprocessor 20, the secure chipset, and the biometric scanner 16.

Other aspects of the disclosure relate to a method of erasing data on a data handling device 10, and may include providing a data handling device with some or all of the elements and characteristics described in this disclosure (see FIG. 1). The data handling device may be provided with the various software and/or hardware suitable to provide the functionality described in this disclosure. For example, a software program or application may run or operate in the background on the data handing device 10 to perform the various functions of the system as disclosed in this disclosure.

Figure 2:
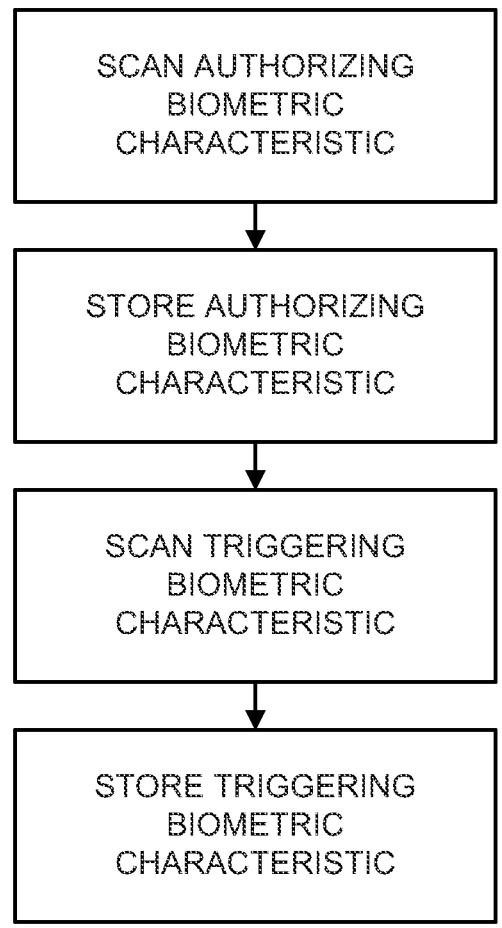
FIG. 2 is a schematic flow diagram of an illustrative implementation of an initiation process of a method of the disclosure.
Figure 3:
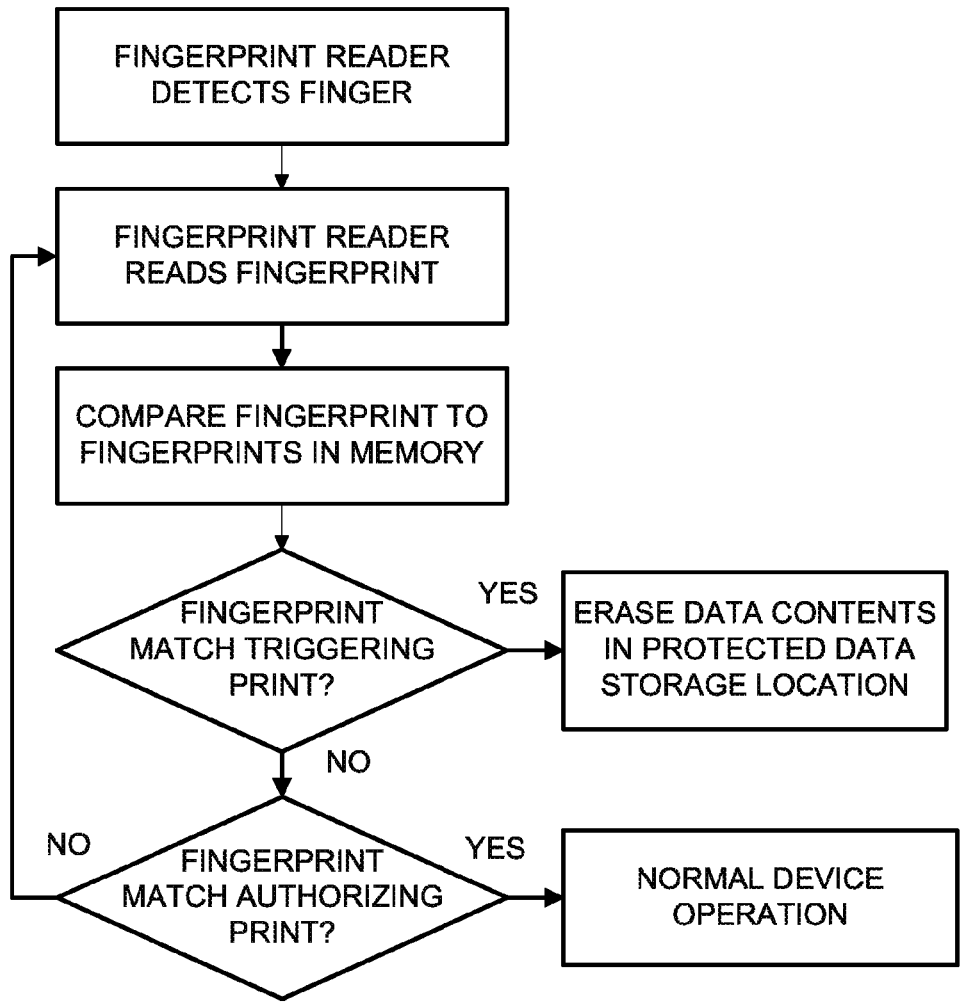
FIG. 3 is a schematic flow diagram of an illustrative implementation of a monitoring process of a method of the disclosure.

Initialization of the system functionality may include the step of scanning of an authorizing biometric characteristic of an authorized user by the biometric characteristic scanning device 16, and may also include storing, on the data handling device, data characterizing the authorizing biometric characteristic of the authorized user (see FIG. 2). Such an authorizing biometric characteristic is obtained and recorded for permitting the user to access the normal operating functions of the device, and primarily functions to control access to the various functions of the device, and help prevent unauthorized users (e.g., users not having the authorizing biometric characteristic) from accessing those functions, at least not without the user's cooperation in first providing the authorizing biometric characteristic. The use of authorizing biometric characteristics is known for controlling access to devices, and may be employed on devices that do not utilize the features of the present disclosure. It should be recognized that the process of scanning and recording the authorizing biometric characteristic may be performed as a part of the initialization of the device separate of other steps involved in the present disclosure. Illustratively, the authorizing biometric characteristic is the fingerprint of a selected finger of the user's hand, such as the index finger (although any finger could suitably be utilized for this biometric characteristic). In the illustrative implementation of this description, the authorizing biometric characteristic comprises a first fingerprint of a first finger of the authorized user's hand.

Initialization of the system functionality may also include scanning a triggering biometric characteristic of a secured user by the biometric characteristic scanning device, and also storing, on the data handling device, data characterizing the triggering biometric characteristic of the secured user. The secured user having the triggering biometric characteristic is not necessarily the authorized user corresponding to the authorizing biometric characteristic, but may correspond depending upon the needs of the user, business, or agency that owns and/or uses the data handling device and the information stored thereon. The secured user is a user of the data handling device 10 that is authorized to use the functionality of the present disclosure, including the erasure functionality. Generally, this functionality is in addition to the normal functions of the device, but a secured user might not be provided with access to the general functionality of the device.

Significantly, the triggering biometric characteristic is different and distinguishable from the authorizing biometric characteristic so that, for example, the erasure functionality of the present disclosure is not initiated when the user simply seeks to operate the normal functionality of the device. For example, in the illustrative implementation, the triggering biometric characteristic may comprise a second fingerprint of a second finger that is different than the first finger and first fingerprint of the authorizing biometric characteristic. Placing the fingertip of the second finger to the scanning device thus may initiate the erasure functionality of the system rather than simply making the normal functionality of the device available to the user. In this way, the user of the device is able select the functionality to be utilized by which finger (or other biometric characteristic) is used to operate the fingerprint scanner of the device (or other biometric scanner). The triggering biometric characteristic may utilize other techniques to differentiate from aspects of normal operation, such as by requiring two or more scans of the same triggering finger which can avoid accidental triggers, or the use of a combination of two fingers in a particular sequence which can provide dual level authentication. The system may thus be initialized and made ready for operation.

Another aspect of the method may be the storing of data to be protected, or protected data, on the data handling device in a protected storage location or element 14 on the data handling device (see FIG. 1). Protected data is data that the user wants to be subject to the special functionality of the disclosure, including the erasure functionality. The protected data may be accessible through normal functional operation of the device (or may be denied regular access such as by the authorized user). The data may be stored on a discrete storage element within the device, or may be located on a partition or space of the device's primary storage element. Illustratively, the protected data may be designated by the user as protected at the time of generation of the data, when the data is downloaded to the device, or may be applied to existing data on the device which may require movement of the data to the protected storage location.

As a part of the implementation of the disclosure on a device, monitoring of the biometric characteristic scanning device 16 may be performed (FIG. 1) in order to detect when a biometric characteristic is being supplied by the user to the scanning device. In the illustrative implementations, this step may include monitoring the fingerprint scanner for an exposure of the fingerprint surface of the finger to the scanner. Further, the method may include detecting a biometric characteristic by the biometric characteristic scanning device (see FIG. 3), and reading or otherwise recognizing the biometric characteristic for further processing of the characteristic data. This may include, for example, detecting the presence of the fingerprint surface of a finger on the fingerprint scanner and scanning the fingerprint and converting the detected characteristics of the fingerprint into a suitable data characterization.

When the biometric scanner has detected a biometric characteristic, then a determination may be made if the detected biometric characteristic corresponds to or matches the triggering biometric characteristic which may include comparing data characterizing the detected biometric characteristic to the stored data characterizing the triggering biometric characteristic. In the illustrative implementation, the fingerprint scanned by the scanning element 16 may be compared to the stored second fingerprint to determine whether the second finger of the user is being presented to the scanner element.

If the detected biometric characteristic corresponds to the triggering biometric characteristic, then the system may initiate the erasure of data in the protected storage location of the device. The erasure of the data in the protected storage location may occur immediately, or substantially immediately, without delay, and may occur without requiring any further steps or actions by the user in order to execute the erasure. In this context, "immediately" is intended to mean within about 10 seconds from the time that the system is triggered by presentation of the triggering biometric characteristic. In some more ideal implementations, the time from the detection of the triggering biological characteristic and the erasure of the protected data storage location is about 5 second or less. In most preferred implementations, the erasure of the protected data may occur regardless of whether the device is "on" or "off," and regardless of whether the user has previously presented the authorizing biometric characteristic to the device. The erasure may be performed without any confirmation steps being performed by the user in order for the erasure of the storage to begin. The erasure of the protected data may also include the overwriting of the storage or memory locations of the protected storage location to make any attempted recovery of the protected data more difficult if not impossible. Further, in some implementations, the data erased may include the software application providing the erasure functionality itself to make the data erasure more difficult to detect after the fact.

If it is determined that the detected biometric characteristic corresponds to the authorizing biometric characteristic, such as through comparison of the data characterizing the detected biometric characteristic to the stored data characterizing the authorizing biometric characteristic, normal operation of the device may be initiated, including access to the normal and regular functionality of the device.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A method of erasing data on a data handling device comprising:
   providing a data handling device including a data storage element configured to store data and a biometric characteristic scanning element configured to scan a biometric characteristic of a user;
   scanning a triggering biometric characteristic of a secured user by the biometric characteristic scanning element and storing, on the data handling device, data characterizing the triggering biometric characteristic of the secured user;
   storing protected data in a protected storage location on the data handling device, the data characterizing the triggering biometric characteristic being stored in a location different from the protected storage location;
   monitoring the biometric characteristic scanning device for detection by the scanning device of a biometric characteristic;
   detecting a biometric characteristic by the biometric characteristic scanning element;
   determining if the detected biometric characteristic corresponds to the triggering biometric characteristic; and
   if the detected biometric characteristic corresponds to the triggering biometric characteristic, then erasing data in the protected storage location in response to a determination that the detected biometric characteristic corresponds to the triggering biometric characteristic;
   wherein the erasure of the data in the protected storage location includes overwriting of locations in the protected storage location.

2. The method of claim 1 wherein the biometric characteristic scanning element comprises a fingerprint scanner and the triggering biometric characteristic comprises a fingerprint.

3. The method of claim 1 additionally comprising scanning an authorizing biometric characteristic of an authorized user by the biometric characteristic scanning device, and storing, on the data handling device, data characterizing the authorizing biometric characteristic of the authorized user.

4. The method of claim 3 wherein the authorizing biometric characteristic comprising a first fingerprint.

5. The method of claim 4 wherein the triggering biometric characteristic comprises a second fingerprint different from the first fingerprint.

6. The method of claim 2 wherein detecting a biometric characteristic comprises detecting the presence of a finger on the fingerprint scanner.

7. The method of claim 1 wherein determining if the detected biometric characteristic corresponds to the triggering biometric characteristic comprises comparing data characterizing the detected biometric characteristic to stored data characterizing the triggering biometric characteristic.

8. The method of claim 3 additionally comprising determining if the detected biometric characteristic corresponds to the authorizing biometric characteristic.

9. The method of claim 8 wherein, if the detected biometric characteristic corresponds to the authorizing biometric characteristic, providing access to functions of the data handling device.

10. The method of claim 1 wherein the erasure of the data in the protected storage location occurs substantially immediately.

11. The method of claim 1 wherein the erasure of the data in the protected storage location occurs without any further action by the user.

12. The method of claim 1 wherein the data handling device comprises a smartphone.

13. A method of erasing data on a data handling device comprising:
- providing a data handling device including a data storage element configured to store data and a fingerprint scanning element configured to scan a biometric characteristic of a user;
- scanning an authorizing fingerprint of an authorized user by the scanning element, and storing, on the data handling device, data characterizing the authorizing fingerprint of the authorized user;
- scanning a triggering fingerprint of a secured user by the scanning element and storing, on the data handling device, data characterizing the triggering fingerprint of the secured user, the triggering fingerprint being different that the authorizing fingerprint;
- storing protected data in a protected storage location on the data handling device, the data characterizing the triggering biometric characteristic being stored in a location different from the protected storage location;
- monitoring the fingerprint scanning device for detection by the scanning element of a fingerprint;
- detecting a fingerprint by the scanning element;
- determining if the detected fingerprint corresponds to the triggering fingerprint; and
- if the detected fingerprint corresponds to the triggering biometric characteristic, then erasing all data in the protected storage location in response to a determination that the detected biometric characteristic corresponds to the triggering biometric characteristic without erasing the data characterizing the triggering biometric characteristic stored in the different location;
- wherein the erasure of the data in the protected storage location includes overwriting of locations in the protected storage location.

14. The method of claim 13 wherein, if the detected fingerprint corresponds to the authorizing fingerprint, providing access to functions of the data handling device.

15. The method of claim 13 wherein the erasure of the data in the protected storage location occurs substantially immediately.

16. The method of claim 13 wherein the erasure of the data in the protected storage location occurs without any further action by the user.

17. The method of claim 1 wherein the data characterizing the triggering biometric characteristic is stored on a separate chipset from the protected storage location containing the protected data.

18. A method of erasing data on a data handling device comprising:
- providing a data handling device including a data storage element configured to store data and a fingerprint scanning element configured to scan a biometric characteristic of a user;
- scanning an authorizing fingerprint of an authorized user by the scanning element, and storing, on the data handling device, data characterizing the authorizing fingerprint of the authorized user;
- scanning a triggering fingerprint of a secured user by the scanning element and storing, on the data handling device, data characterizing the triggering fingerprint of the secured user, the triggering fingerprint being different that the authorizing fingerprint;
- storing data in storage on the data handling device;
- monitoring the fingerprint scanning device for detection by the scanning element of a fingerprint;
- detecting a fingerprint by the scanning element;
- determining if the detected fingerprint corresponds to the triggering fingerprint; and
- if the detected fingerprint corresponds to the triggering biometric characteristic, then erasing all data in storage on the data handling device in response to a determination that the detected biometric characteristic corresponds to the triggering biometric characteristic without erasing the data characterizing the triggering biometric characteristic stored in the different location.

* * * * *